(12) United States Patent
Mori et al.

(10) Patent No.: US 10,990,710 B2
(45) Date of Patent: Apr. 27, 2021

(54) ELECTRONIC APPARATUS

(71) Applicant: Panasonic Intellectual Property Management Co., Ltd., Osaka (JP)

(72) Inventors: Takeshi Mori, Osaka (JP); Kenichi Shindo, Osaka (JP); Yusuke Katsuyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 201 days.

(21) Appl. No.: 15/950,720

(22) Filed: Apr. 11, 2018

(65) Prior Publication Data

US 2018/0232543 A1    Aug. 16, 2018

Related U.S. Application Data

(63) Continuation of application No. PCT/JP2016/003572, filed on Aug. 3, 2016.

(30) Foreign Application Priority Data

Nov. 6, 2015    (JP) .............................. JP2015-218853

(51) Int. Cl.
*G06F 21/88* (2013.01)
*G06F 1/16* (2006.01)
*H05K 5/02* (2006.01)

(52) U.S. Cl.
CPC ............ *G06F 21/88* (2013.01); *G06F 1/1616* (2013.01); *G06F 1/1654* (2013.01); *H05K 5/0221* (2013.01)

(58) Field of Classification Search
None
See application file for complete search history.

(56) References Cited

U.S. PATENT DOCUMENTS 5,144,290 A * 9/1992 Honda .................. G06F 1/1616
16/306
5,262,759 A * 11/1993 Moriconi .............. G06F 1/1616
361/679.29

(Continued)

FOREIGN PATENT DOCUMENTS

CA          2437537 A     8/2003
JP        09-006475 A     1/1997

(Continued)

OTHER PUBLICATIONS

International Search Report for corresponding Application No. PCT/JP2016/003572, dated Nov. 1, 2016.

*Primary Examiner* — James Wu
*Assistant Examiner* — Christopher L Augustin
(74) *Attorney, Agent, or Firm* — Renner, Otto, Boisselle & Sklar, LLP

(57) ABSTRACT

An electronic device includes a first unit having an input part and a second unit having a display. The first unit and the second unit are detachably coupled. The first unit includes a socket capable of housing a predetermined side of the second unit. Locked holes, into which a lock projection of a lock member can be inserted, are provided on one of right and left sides of the socket and the second unit. An interlocking lock mechanism is provided on another of the right and left sides of the socket and the second unit. The interlocking lock mechanism locks the second unit to the socket when the lock projection of the lock member is inserted into the locked holes.

1 Claim, 13 Drawing Sheets

(56) References Cited

U.S. PATENT DOCUMENTS

| | | | | |
|---|---|---|---|---|
| 5,751,548 | A * | 5/1998 | Hall | F16C 11/10 |
| | | | | 248/122.1 |
| 5,790,375 | A | 8/1998 | Lee | |
| 2008/0165492 | A1* | 7/2008 | Ward | G06F 1/1624 |
| | | | | 361/679.37 |
| 2009/0141439 | A1* | 6/2009 | Moser | G06F 1/1616 |
| | | | | 361/679.29 |
| 2011/0266230 | A1* | 11/2011 | Carnevali | G06F 1/1632 |
| | | | | 211/26 |
| 2013/0286299 | A1* | 10/2013 | Sato | H04N 5/64 |
| | | | | 348/839 |
| 2013/0301201 | A1* | 11/2013 | Hsu | H05K 5/0221 |
| | | | | 361/679.09 |
| 2014/0085794 | A1* | 3/2014 | Zawacki | G06F 1/1679 |
| | | | | 361/679.09 |
| 2014/0355196 | A1* | 12/2014 | Hashimoto | G06F 1/1632 |
| | | | | 361/679.27 |
| 2015/0036273 | A1* | 2/2015 | Hui | G06F 1/166 |
| | | | | 361/679.08 |
| 2015/0378399 | A1* | 12/2015 | Grinstead | G06F 1/1681 |
| | | | | 361/679.09 |
| 2016/0062414 | A1* | 3/2016 | Nishioka | G06F 1/1669 |
| | | | | 361/679.09 |

FOREIGN PATENT DOCUMENTS

| | | |
|---|---|---|
| JP | 2000-137542 A | 5/2000 |
| JP | 2003-241853 A | 8/2003 |
| JP | 2013-231839 A | 11/2013 |
| WO | 2009098780 A1 | 8/2009 |

\* cited by examiner

ELECTRONIC APPARATUS

BACKGROUND

1. Technical Field

The present disclosure relates to an electronic device in which a first casing and a second casing are detachable.

2. Description of the Related Art

PTL 1 discloses a docking station (a mounting device) capable of mounting a notebook type computer (an electronic device). Normally, the notebook type computer has a first casing having a keyboard and a central processing unit and a second casing having a display. The first casing and the second casing are coupled such that they are relatively rotatable around a first rotating axial center. In the docking station in PTL 1, a mounting part, on which the first casing is mounted, is provided on an upper surface of a case (a casing). The mounting part includes a hook member (a lock member) lockable to a locked hole. The locked hole is provided on a bottom surface of the first casing of the notebook type computer. By operating an operating member, the lock member can be moved between a lock state in which the lock member is locked to the locked hole and an unlock state in which the lock member is not locked to the locked hole.

CITATION LIST

Patent Literature

PTL 1: Unexamined Japanese Patent Publication No. H09-6475

SUMMARY

An object of the present disclosure is to improve security against theft in an electronic device in which a first casing and a second casing are detachable.

An electronic device of the present disclosure includes: a first unit having an input part; and a second unit having a display. The first unit and the second unit are detachably coupled. The first unit includes a socket capable of housing a predetermined side of the second unit. Insertion holes, into which a security member can be inserted, are provided on one of right and left sides of the socket and the second unit.

An interlocking lock mechanism is provided on the other of the right and left sides of the socket and the second unit. The interlocking lock mechanism locks the second unit to the socket when the security member is inserted into the insertion holes.

In the electronic device of the present disclosure, when the security member is inserted into the insertion holes provided on the one side of the socket and the second unit, the second unit can be locked to the socket on these two right and left sides. Therefore, strength of locking can be improved more than a case where the second unit is locked to the socket on the one side. Further, security against theft can be improved in the electronic device in which the first unit and the second unit are separable.

DETAILED DESCRIPTION

Hereinafter, exemplary embodiments are described in detail with reference to the drawings as appropriate. However, detailed description beyond necessity may be omitted. For example, detailed description of a matter that has been already known well or overlapping description of substantially the same configuration may be omitted. This is to avoid unnecessary redundancy of the following description and to facilitate understanding by those skilled in the art.

Note that the inventor of the present disclosure provides the attached drawings and the following description for those skilled in the art to fully understand the present disclosure, and do not intend to limit the subject matter as described in the appended claims by these drawings and description.

(Background of the Present Disclosure)

As described in SUMMARY, various important information pieces are recorded on an electronic device such as a notebook type computer. Accordingly, improvement of security against theft is demanded. If the docking station described in above PTL 1 can lock the notebook type computer in the lock state, the notebook type computer cannot be detached.

However, a notebook type computer in recent years is provided with a central processing unit on a second casing side having a display. A first casing having a keyboard and the second casing having the display and the central processing unit are separable, and the second casing can be utilized as a tablet type computer. In a case where a technique described in PTL 1 is applied to this notebook type computer (the electronic device), while the first casing is fixed to the docking station, the second casing, on which the important information pieces are recorded, is detachable.

Meanwhile, it is considered that a lock structure identical to a lock structure of the first casing is also applied to the second casing, thereby making it impossible to detach the second casing. However, in this case, a user must perform lock operation and unlock operation on each of the first casing and the second casing.

Therefore, the present disclosure provides an electronic device capable of improving security against theft even in a case where a first casing and a second casing of the electronic device mounted on a mounting part are separable. Further, the present disclosure provides the electronic device capable of collectively locking and unlocking both of the first casing and the second casing.

First Exemplary Embodiment

Hereinafter, a first exemplary embodiment is described with reference to the drawings.
[1. Configuration]
[1-1. Configuration of Electronic Device]

Figure 1A:
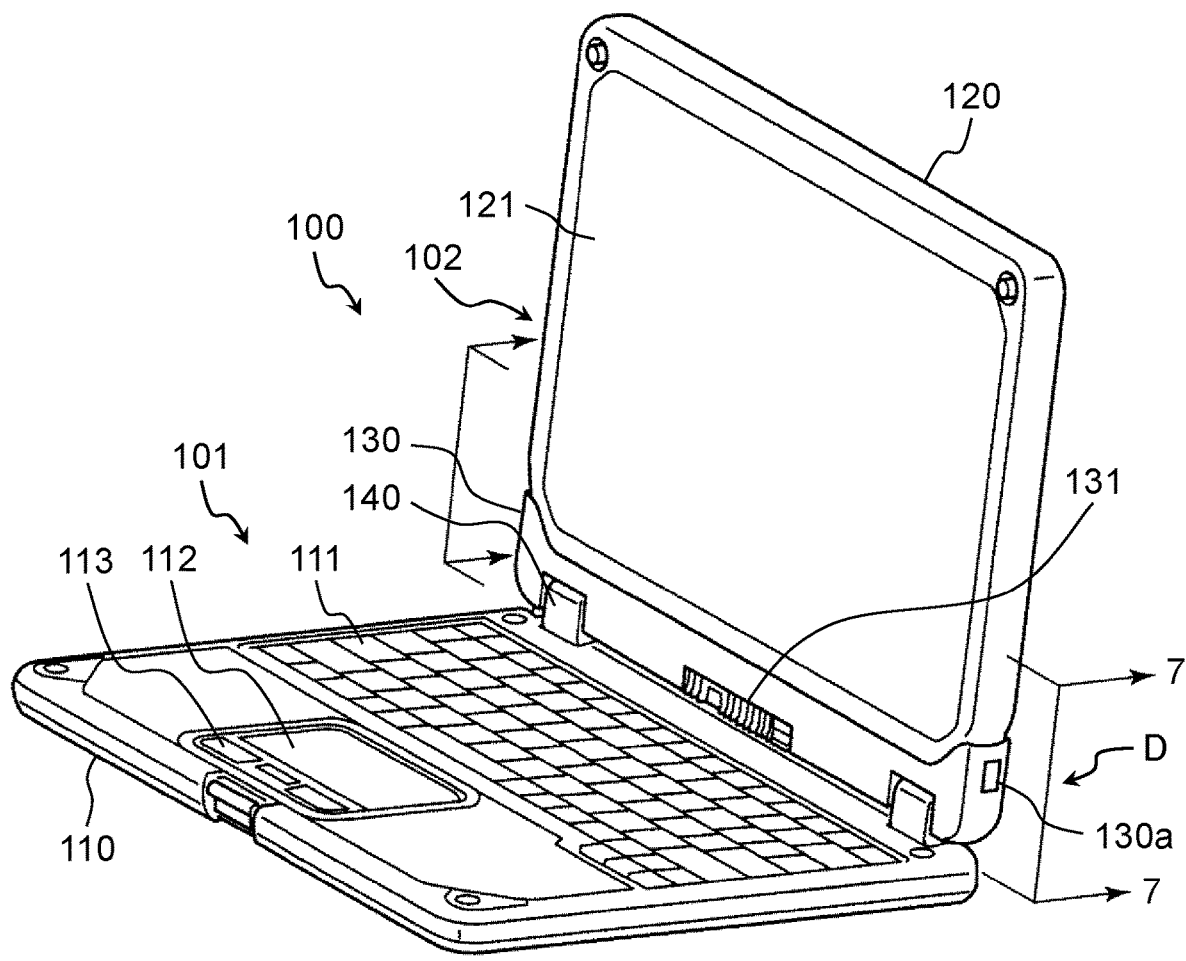
FIG. 1A is a perspective view of an electronic device according to a first exemplary embodiment of the present disclosure.
Figure 1A:
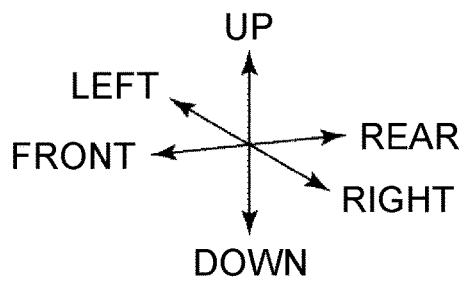
Figure 1B:
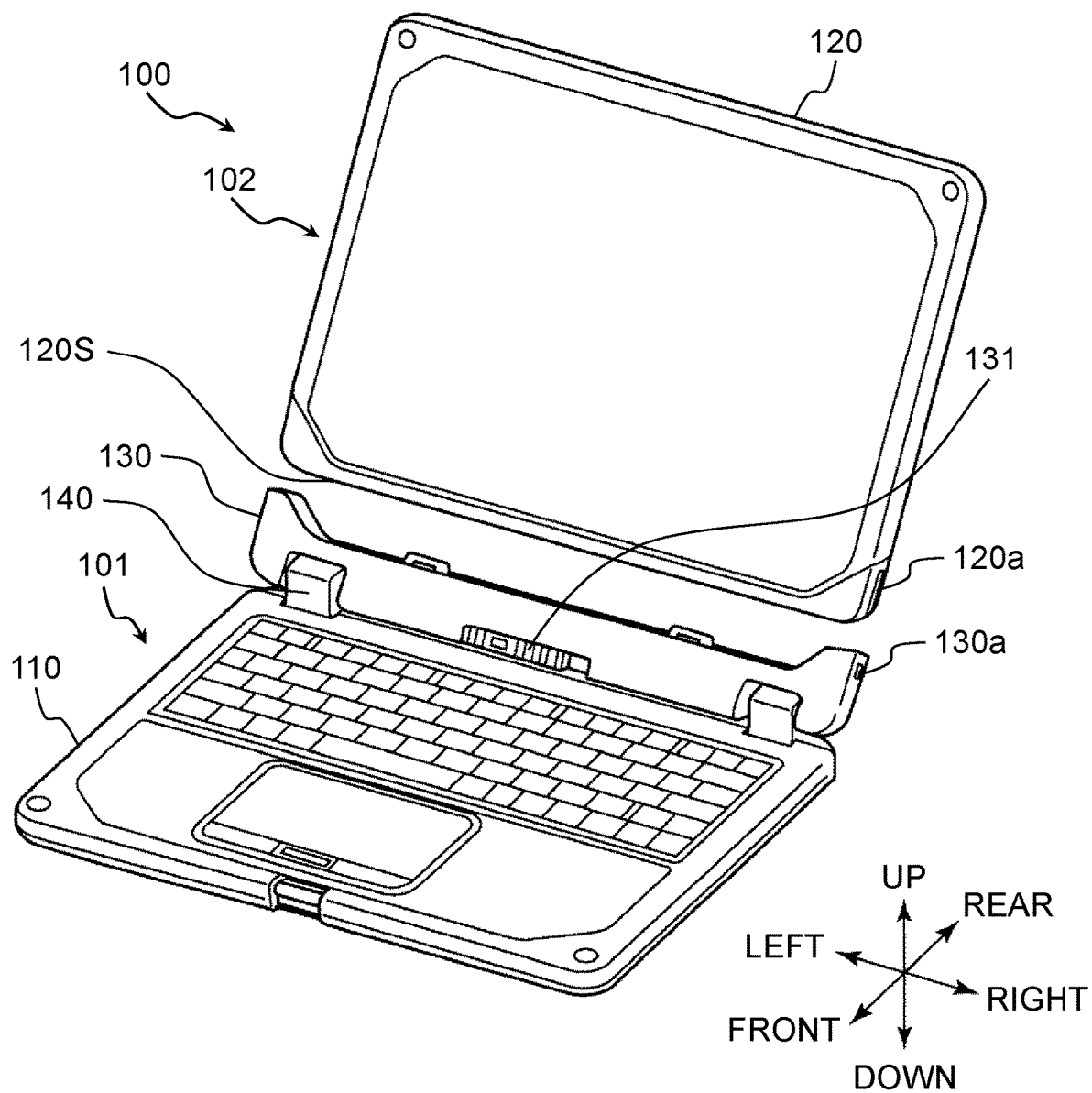
FIG. 1B is a perspective view (a perspective view seen from a right side) showing a state in which the electronic device according to the first exemplary embodiment of the present disclosure is separated into a first unit and a second unit.
Figure 1C:
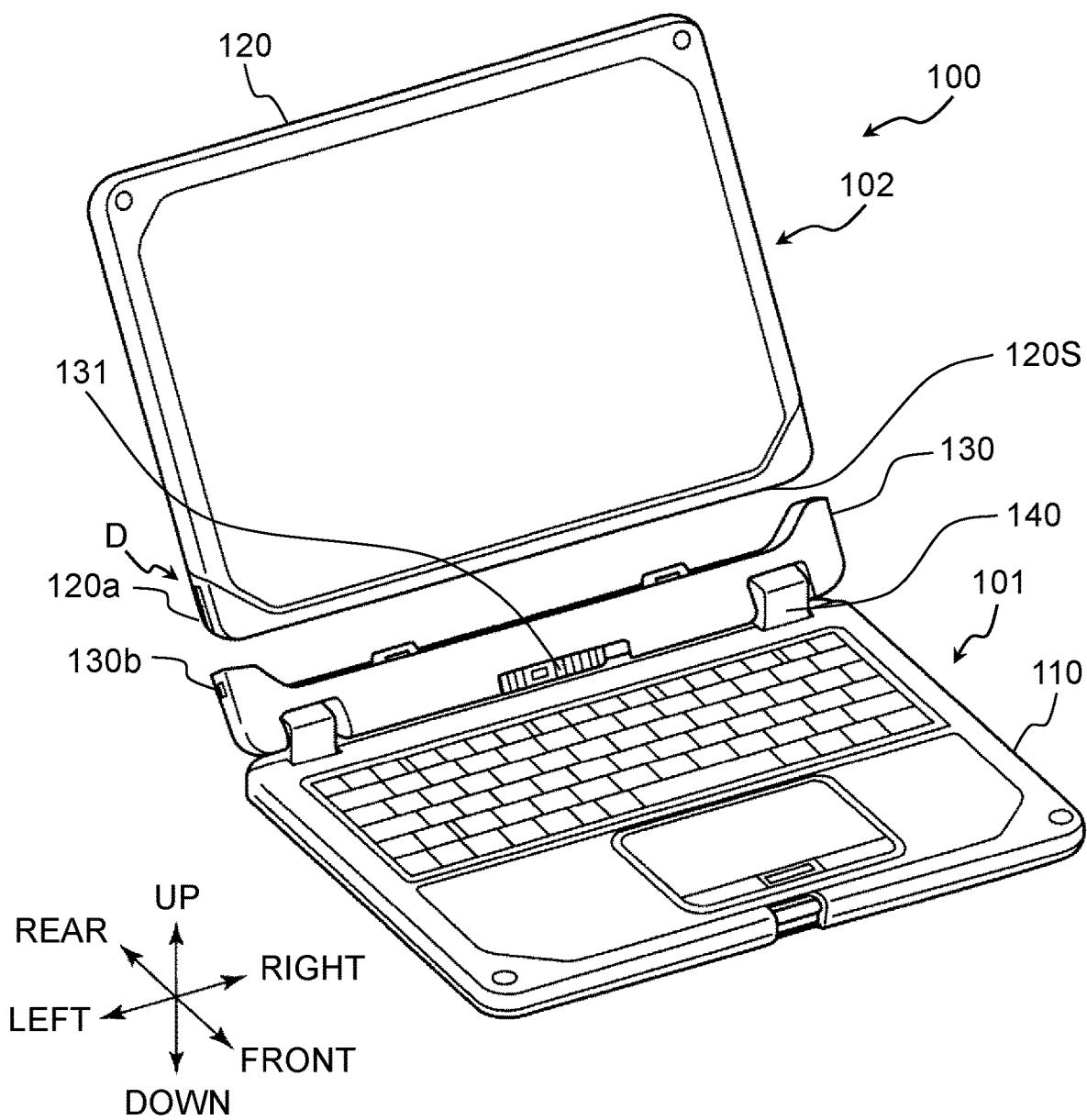
FIG. 1C is a perspective view (a perspective view seen from a left side) showing the state in which the electronic device according to the first exemplary embodiment of the present disclosure is separated into the first unit and the second unit.

FIG. 1A is a perspective view of an electronic device according to the first exemplary embodiment of the present disclosure. FIG. 1B is a perspective view (a perspective view seen from a right side) showing a state in which the electronic device according to the first exemplary embodiment of the present disclosure is separated into a first unit and a second unit. FIG. 1C is a perspective view (a perspective view seen from a left side) showing the state in which the electronic device according to the first exemplary embodiment of the present disclosure is separated into the first unit and the second unit.

As shown in FIG. 1A, directions are defined herein to explain a configuration of the electronic device. It should be noted that the definitions are for convenience of explanation of the configuration of the electronic device, and do not limit an absolute arrangement condition or the like of a component. It should be noted that "front", "rear", "up", "down", "left", and "right" based on the definitions of the aforementioned directions are shown in FIG. 1B and afterward.

As shown in FIG. 1A, electronic device 100 includes first unit 101 and second unit 102. Second unit 102 and first unit 101 are detachable. With this configuration, electronic device 100 is constituted as a so-called detachable type computer. FIGS. 1A and 1B are perspective views of electronic device 100 according to the present exemplary embodiment. Specifically, FIG. 1A shows a state in which second unit 102 is attached to first unit 101, and FIG. 1B shows a state in which second unit 102 is detached from first unit 101.

Second unit 102 is a tablet type computer. Second unit 102 includes display 121. Display 121 is, for example, a liquid crystal display panel. Further, display 121 is a touch panel capable of receiving touch operation by a user. Second unit 102 incorporates a central processing unit (CPU), a volatile storage (RAM), a nonvolatile storage (ROM, SSD, or the like), a battery, and the like. The nonvolatile storage (ROM, SSD, or the like) stores an operating system (OS), various application programs, various data, and the like. The central processing unit (CPU) executes arithmetic processing by reading the OS, the application programs, and the various data, thereby realizing various functions.

First unit 101 includes an input part capable of performing input processing by the user, and is detachable from second unit 102. First unit 101 includes first casing 110, socket 130, and hinge 140.

First casing 110 is formed of metal such as magnesium alloy or resin. Keyboard 111, touch pad 112, a plurality of operation buttons 113, and the like are provided as the above-described input part on a principal surface of first casing 110 (a surface on a front side in a device thickness direction).

Socket 130 is capable of housing a side 120S on a lower side in an up and down direction of second casing 120 of second unit 102 (hereinafter appropriately referred to as "lower side 120S").

Hinge 140 couples a side on a rear side of first casing 110 and a side on a lower side of socket 130 such that first casing 110 and socket 130 are relatively rotatable. Hinge 140 has rotating axial center AX parallel to a width direction (a right and left direction) of electronic device 100. For example, as shown in FIG. 1A, hinge 140 can hold second unit 102 and first unit 101 in a state in which second unit 102 and first unit 101 are opened at an angle of, for example, about 90 degrees. Further, hinge 140 can make second casing 120 of second unit 102 in a closed state with respect to first casing 110 of first unit 101 (a state in which a principal surface of second casing 120 and the principal surface of first casing 110 are closely opposed and substantially parallel to each other).

Socket 130 is provided with a connector (not shown) connected with a connector (not shown) of second casing 120 in a state in which lower side 120S of second casing 120 is housed. Various signals and electric power are given and received between second unit 102 and first unit 101 via these connectors. For example, signals output from the input part including keyboard 111, touch pad 112, the plurality of operation buttons 113, and the like, of first casing 110 of first unit 101 can be output to second unit 102. Second unit 102 can receive these signals and perform control based on the received signals. Therefore, electronic device 100 can be utilized as a notebook type computer by attaching second unit 102 to first unit 101. Further, second unit 102 can be utilized alone as a tablet type computer.

[1-2. Mounting Device]
[1-2-1. Summary of Mounting Device]

Figure 2:
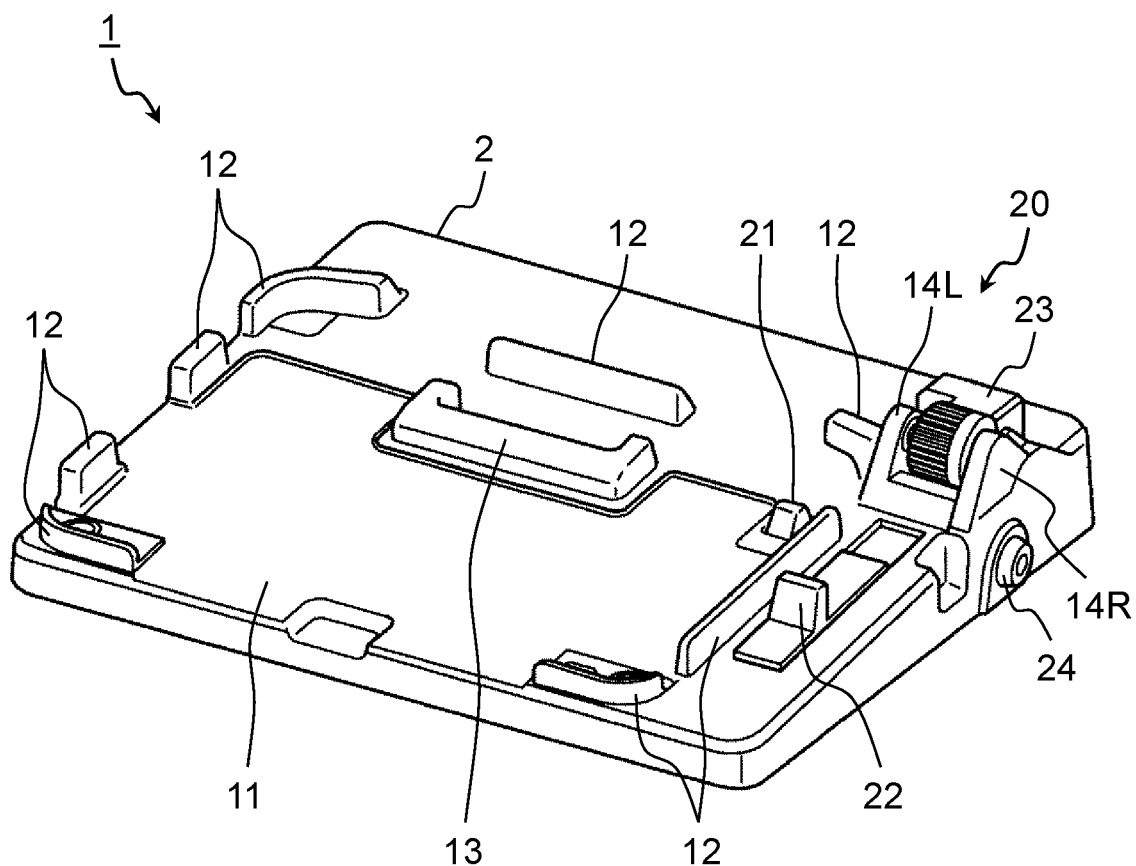
FIG. 2 is a perspective view of a mounting device capable of mounting the electronic device according to the first exemplary embodiment of the present disclosure.
Figure 2:
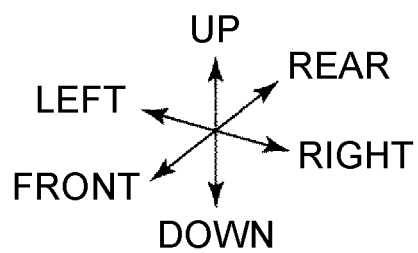
Figure 3:
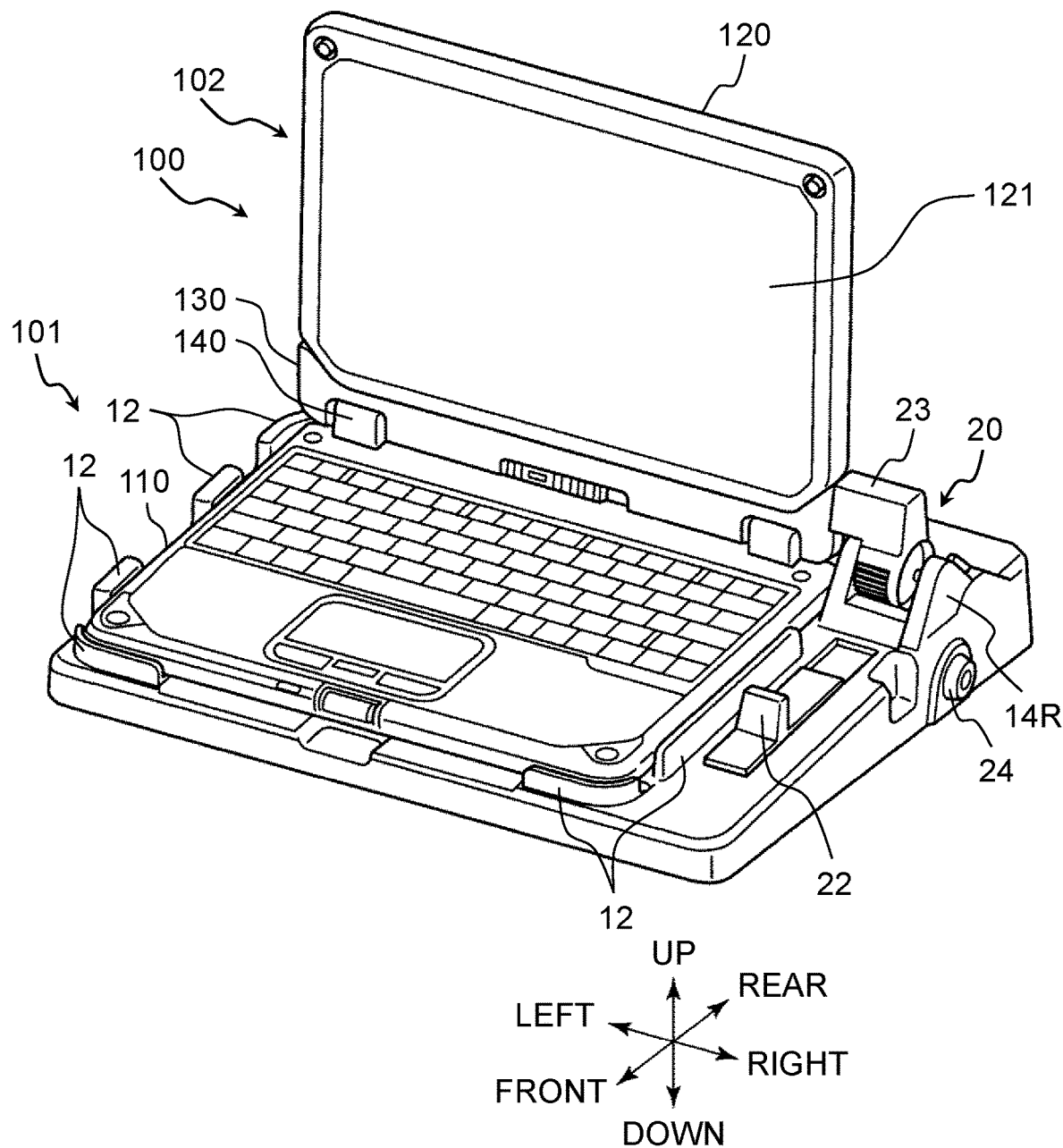
FIG. 3 is a perspective view showing a state in which the electronic device according to the first exemplary embodiment of the present disclosure is mounted on the mounting device.

FIG. 2 is a perspective view of a mounting device capable of mounting the electronic device according to the first exemplary embodiment of the present disclosure. FIG. 3 is a perspective view showing a state in which the electronic device is mounted on the mounting device.

Mounting device 1 of the present exemplary embodiment is utilized by fixing to, for example, a dashboard of an automobile. As shown in FIG. 2, mounting device 1 has a flat table shape. Mounting part 11, on which the electronic device is mounted, is provided on an upper surface of casing 2 of mounting device 1. Moreover, as shown in FIG. 3, lock member 23 is locked to second casing 120 of electronic device 100 in a state in which electronic device 100 is mounted on mounting part 11, and then cylinder lock 24 is operated to lock second casing 120. Accordingly, electronic device 100 cannot be detached from mounting device 1.

Mounting device 1 can be fixed to a vehicle with a fastening member such as a bolt or a screw. The fixation with the fastening member may be performed at a position where the fixation cannot be easily accessed from outside, or in a mode in which the fixation cannot be released unless dedicated tools are used. This makes it difficult to detach mounting device 1 itself from the vehicle. It should be noted that mounting device 1 may be utilized not in the vehicle, but in a state in which mounting device 1 is fixed to a structure, a desk, or the like at a company or home.

[1-2-2. Configuration of Mounting Device]

As shown in FIG. 2, mounting device 1 has the table shape. Mounting part 11, on which electronic device 100 is mounted, is provided on the upper surface of casing 2 of mounting device 1. A plurality of projections 12 that protrudes upward is provided around mounting part 11 such that projections 12 intermittently surround sides of first casing 110 of electronic device 100 to be mounted.

Biasing projection member 13 is provided near a center in a width direction of mounting part 11. Biasing projection member 13 is supported by casing 2 so as to be movable in the up and down direction between a first position (a position shown in FIG. 2) and a second position. At the first position, an upper end of biasing projection member 13 protrudes upward from the upper surface of mounting part 11 by a predetermined amount. At the second position, the upper end of biasing projection member 13 is retreated downward from the upper surface of mounting part 11. Biasing projection member 13 is biased to the first position side (upward) by a spring member (not shown). Biasing projection member 13 and the spring member support lifting of the electronic device upward when a user detaches the electronic device serving as a heavy object from mounting part 11.

Lock mechanism 20 is provided on a right side of mounting part 11. Lock mechanism 20 locks and fixes electronic device 100 in a state in which electronic device 100 is mounted on mounting part 11.

As shown in FIG. 3, in a state in which electronic device 100 is mounted on mounting device 1, first casing 110 of electronic device 100 is intermittently surrounded by the plurality of projections 12 disposed around mounting part 11. As a result, movement of first casing 110 in the right and left direction and a front and rear direction is regulated in the mounted state. In other words, first casing 110 of electronic device 100 can be mounted on mounting part 11 only in a predetermined positional relation.

Further, lock member 23 described below is locked to a right side in a device width direction of second casing 120 of electronic device 100 mounted on mounting device 1. As a result, when lock member 23 is locked to second casing 120 in the state in which electronic device 100 is mounted on mounting device 1, lock member 23 regulates movement of second casing 120 in the up and down direction and the front and rear direction. Further, in second casing 120, lower side 120S is fitted to the socket, and front and rear sides and right and left sides of lower side 120S are covered with socket 130. With this configuration, movement of second casing 120 in the device width direction (the right and left direction) is also regulated. Therefore, movement of electronic device 100 in any direction is regulated.

[1-2-3. Lock Mechanism]

As shown in FIG. 2, lock mechanism 20 has movable projection member 21, operating member 22, lock member 23, and cylinder lock 24. Further, lock mechanism 20 has a moving mechanism that drives lock member 23 according to movement of movable projection member 21, operating member 22, lock member 23, and cylinder lock 24. Before describing these configurations, description is first given of a lock structure between lock member 23 of mounting device 1 and second casing 120 of electronic device 100.

[1-2-4. Lock Structure Between Lock Member of Mounting Device and Second Casing of Electronic Device]

Figure 4:
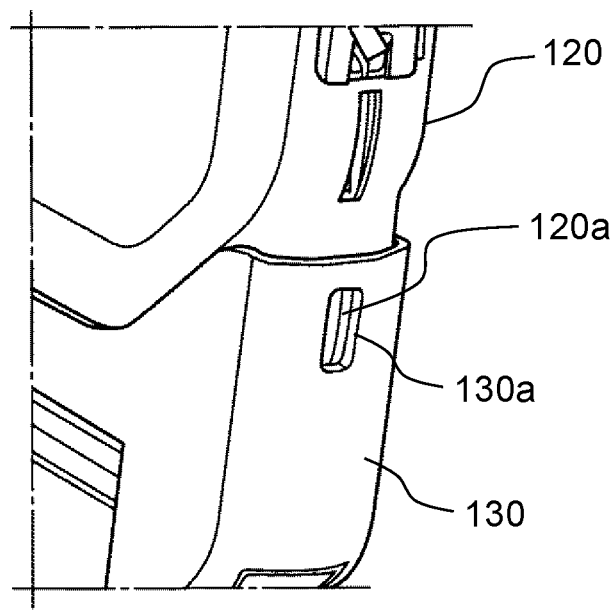
FIG. 4 is an enlarged perspective view of locked holes of the electronic device according to the first exemplary embodiment of the present disclosure (an enlarged perspective view of a portion shown by arrow D in FIG. 1A)
Figure 4:
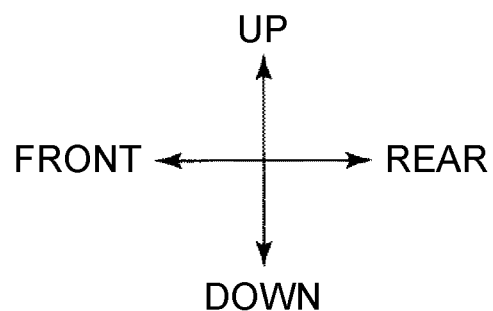

FIG. 4 is an enlarged perspective view of locked holes of the electronic device according to the first exemplary embodiment of the present disclosure (an enlarged perspective view of a portion shown by arrow D in FIG. 1A). As shown in FIG. 4 and aforementioned FIG. 1B, second casing 120 of the electronic device has locked hole 120a at a lower part on the right side. Further, socket 130 of first casing 110 of the electronic device has locked hole 130a at an upper part on a right side. Locked hole 120a of second casing 120 and locked hole 130a of socket 130 are formed at an overlapping position in a state in which second casing 120 is attached to socket 130, as seen in a direction parallel to rotating axial center AX (see FIGS. 6A and 6B) of hinge 140.

Figure 5A:
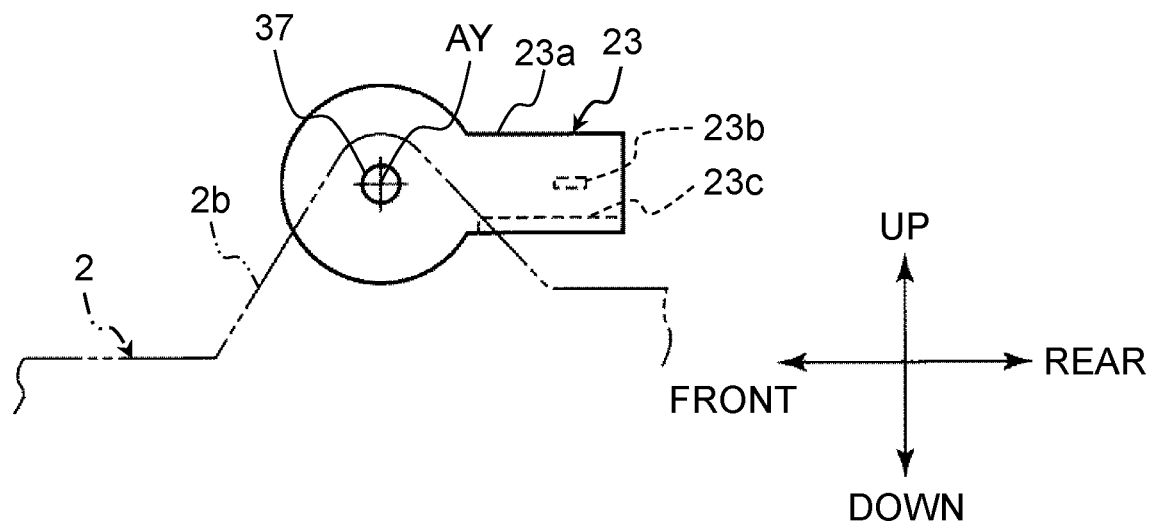
FIG. 5A is a side view of a portion near a lock member of the mounting device.
Figure 5B:
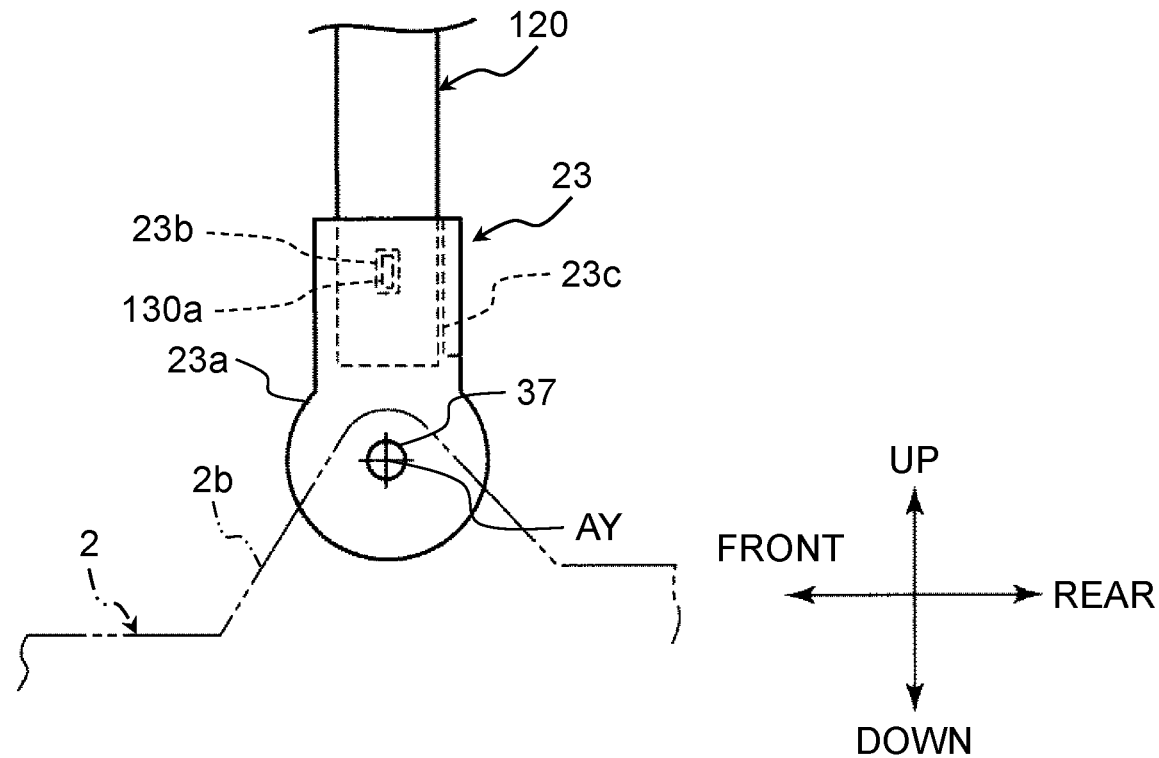
FIG. 5B is a side view of the portion near the lock member of the mounting device.
Figure 6A:
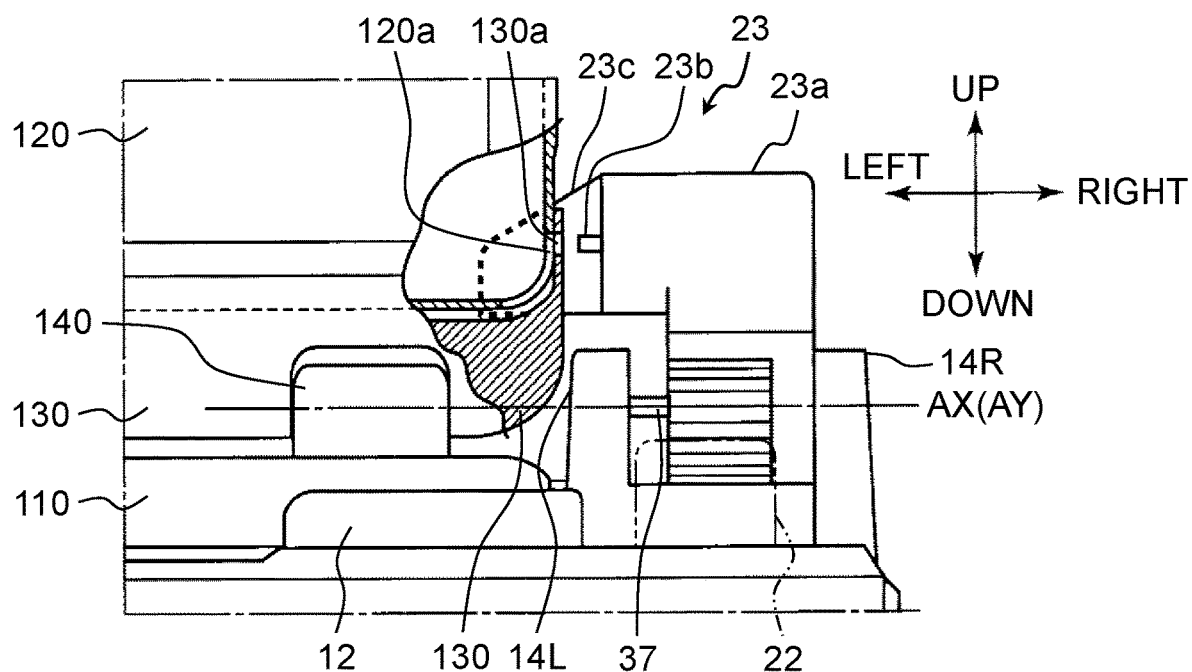
FIG. 6A is a front view of the portion near the lock member of the mounting device.
Figure 6B:
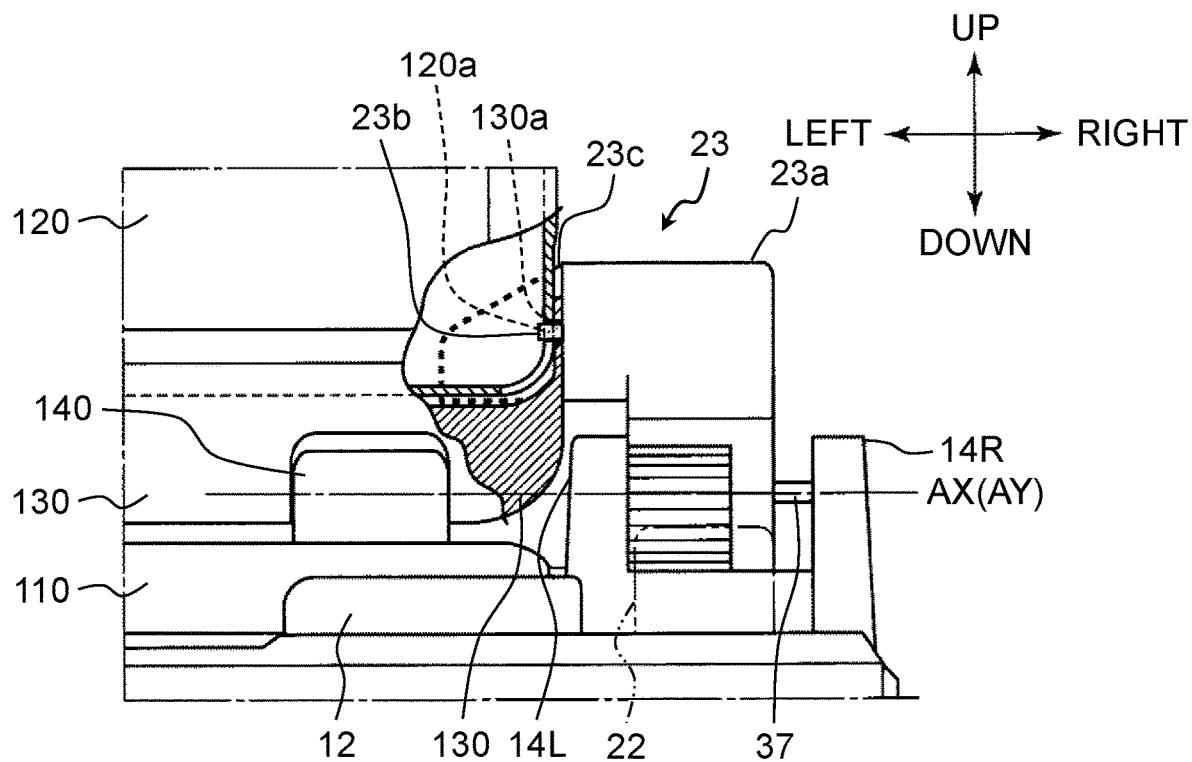
FIG. 6B is a front view of the portion near the lock member of the mounting device.

FIGS. 5A and 5B are side views of a portion near lock member 23 of the mounting device. FIGS. 6A and 6B are front views of the portion near lock member 23 of the mounting device.

Lock member 23 is configured by casing 2 such that lock member 23 is rotatable around second shaft 37 that extends in the device width direction. Lock member 23 is rotatable between an initial position and a locked hole side position in the state in which electronic device 100 is mounted on mounting device 1. Rotating axial center AY of second shaft 37 is located on an extension line of rotating axial center AX of hinge 140. In other words, rotating axial center AY of second shaft 37 is coaxial with rotating axial center AX of hinge 140.

Further, lock member 23 is movable parallel to a direction of rotating axial center AY of second shaft 37. Lock member 23 is biased in a direction in which lock member 23 rotates counterclockwise around second shaft 37, as seen from a right side surface of mounting device 1.

Lock member 23 has main body 23a, lock projection 23b, and abutting part 23c.

Main body 23a has a lever shape and is rotatably supported by second shaft 37 on one end side.

Lock projection 23b is a projection that protrudes from a side surface on an inner side in the device width direction of main body 23a to the inner side in the device width direction. Lock projection 23b has a shape and a size capable of locking to locked hole 120a of second casing 120 and locked hole 130a of socket 130.

Abutting part 23c extends from an end on the inner side in the device width direction and a rear side of main body 23a in the device width direction.

When lock member 23 rotates around second shaft 37, abutting part 23c abuts on a back surface of second casing 120. At this time, lock projection 23b of lock member 23 is located on an outer side in the device width direction of locked hole 120a of second casing 120 and locked hole 130a of socket 130. In this state, cylinder lock 24 is rotated to a lock state by utilizing a key. Then, abutting part 23c moves to the inner side in the device width direction, and lock projection 23b of lock member 23 is locked to locked hole 120a of second casing 120 and locked hole 130a of socket 130.

As described above, lock mechanism 20 has movable projection member 21, operating member 22, lock member 23, cylinder lock 24, and the moving mechanism.

Movable projection member 21 is provided to be movable in the up and down direction between an upward protruding position and a retreating position within an up-and-down through-hole formed in mounting part 11. The "upward protruding position" is a position at which an upper end of movable projection member 21 protrudes upward from the upper surface of mounting part 11 by a predetermined amount (a position shown in FIG. 2). The "retreating position" is a position at which movable projection member 21 retreats downward from the upper surface of mounting part 11. Movable projection member 21 has, on a rear side, vertical wall 21a directed to the rear side.

Operating member 22 is provided movably in the front and rear direction. Operating member 22 is a member operated by a user when lock member 23 is rotated from the locked hole side position or the other position to the initial position, that is, when lock member 23 is returned to the initial position. The "locked hole side position" is a rotational position around second shaft 37 of lock member 23, shown in FIG. 5B. At the "locked hole side position", locked hole 120a of second casing 120 and locked hole 130a of socket 130 of electronic device 100 mounted on mounting part 11 overlap with lock projection 23b of lock member 23, as seen from one end in the device width direction. The "locked hole side position" is changed according to a rotational position of second casing 120 of electronic device 100. When lock member 23 is moved in the device width direction (the right and left direction) while lock member 23 is located at the locked hole side position, lock projection 23b of lock member 23 can be locked to locked hole 120a of second casing 120 and locked hole 130a of socket 130. The "initial position" is a rotational position around second shaft 37 of lock member 23, shown in FIG. 5A. At the "initial position", lock member 23 is fallen to a rear side of second shaft 37 at an angle of about 90 degrees with respect to the up and down direction, and cannot be rotated clockwise any further (when the left side is seen from the right side in the device width direction). Since vertical wall 21a of movable projection member 21 abuts on a front end of gear member 32 described below, the lock member 23 cannot be rotated.

Cylinder lock 24 is a lock capable of rotating second shaft 37 by 90 degrees by inserting a corresponding key.

The moving mechanism has a first moving mechanism, a second moving mechanism, and a third moving mechanism. The first moving mechanism is a mechanism that moves lock member 23 to the locked hole side position based on movement of movable projection member 21 in the up and down direction. The second moving mechanism is a mechanism that moves lock member 23 to the initial position based on movement of operating member 22 in the front and rear direction. The third moving mechanism is a mechanism that moves lock member 23 between the locked hole side position and a lock position in the device width direction according to locking operation using the key corresponding to cylinder lock 24.

[1-3. Interlocking Lock Mechanism of Second Unit]

Electronic device 100 according to the present exemplary embodiment has an interlocking lock mechanism. In the interlocking lock mechanism, when lock projection 23b of lock member 23 is inserted in locked holes 130a, 120a respectively provided on the right sides of socket 130 and second unit 102, a left side of second unit 102 is also locked to a left side of socket 130. Details are described below.

Figure 7:
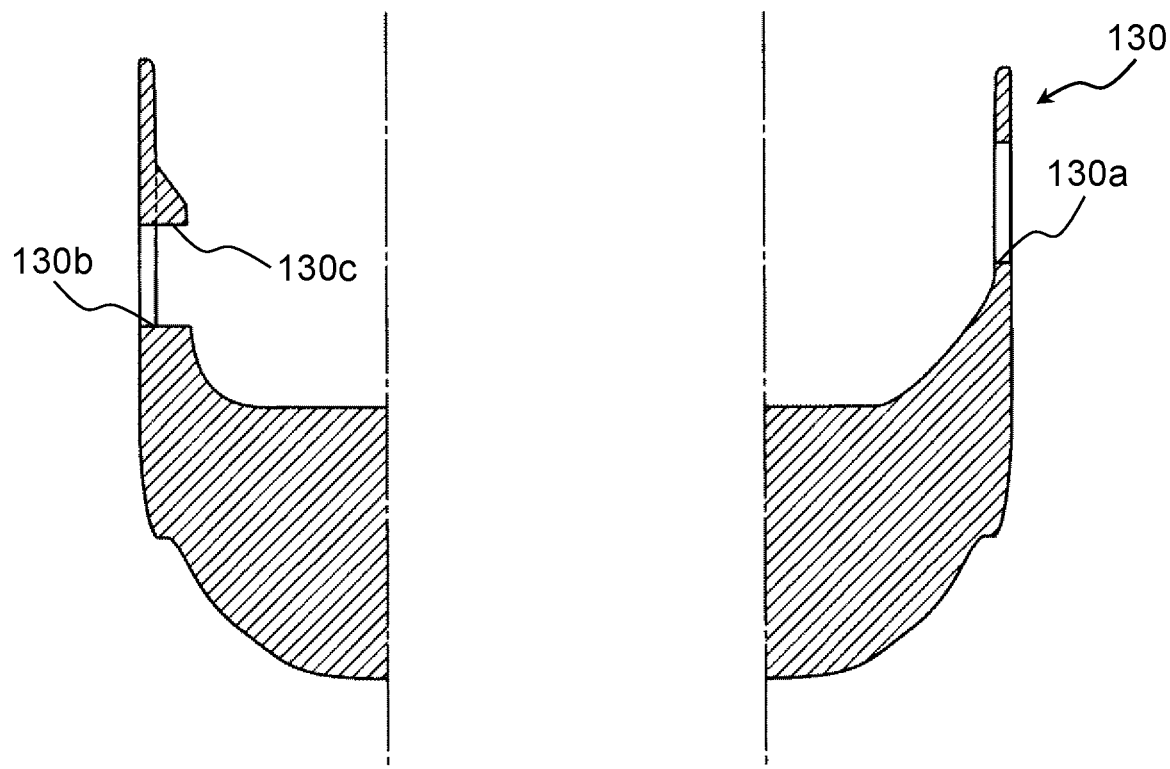
FIG. 7 is a sectional view of a socket of the first unit taken along line 7-7 in FIG. 1A.

FIG. 7 is a sectional view of socket 130 of first unit 101 taken along line 7-7 in FIG. 1A. As shown in FIG. 7 and aforementioned FIGS. 1B and 1C, socket 130 of first unit 101 has locked hole 130a on a right side surface and locked hole 130b on a left side surface. Locked projection 130c that protrudes to an inner side of socket 130 is formed on an upper end side of locked hole 130b on the left side surface. It should be noted that locked projection 130c is provided in the present exemplary embodiment. However, if locked projection 130c is provided, locked hole 130b is not essential.

Figure 8:
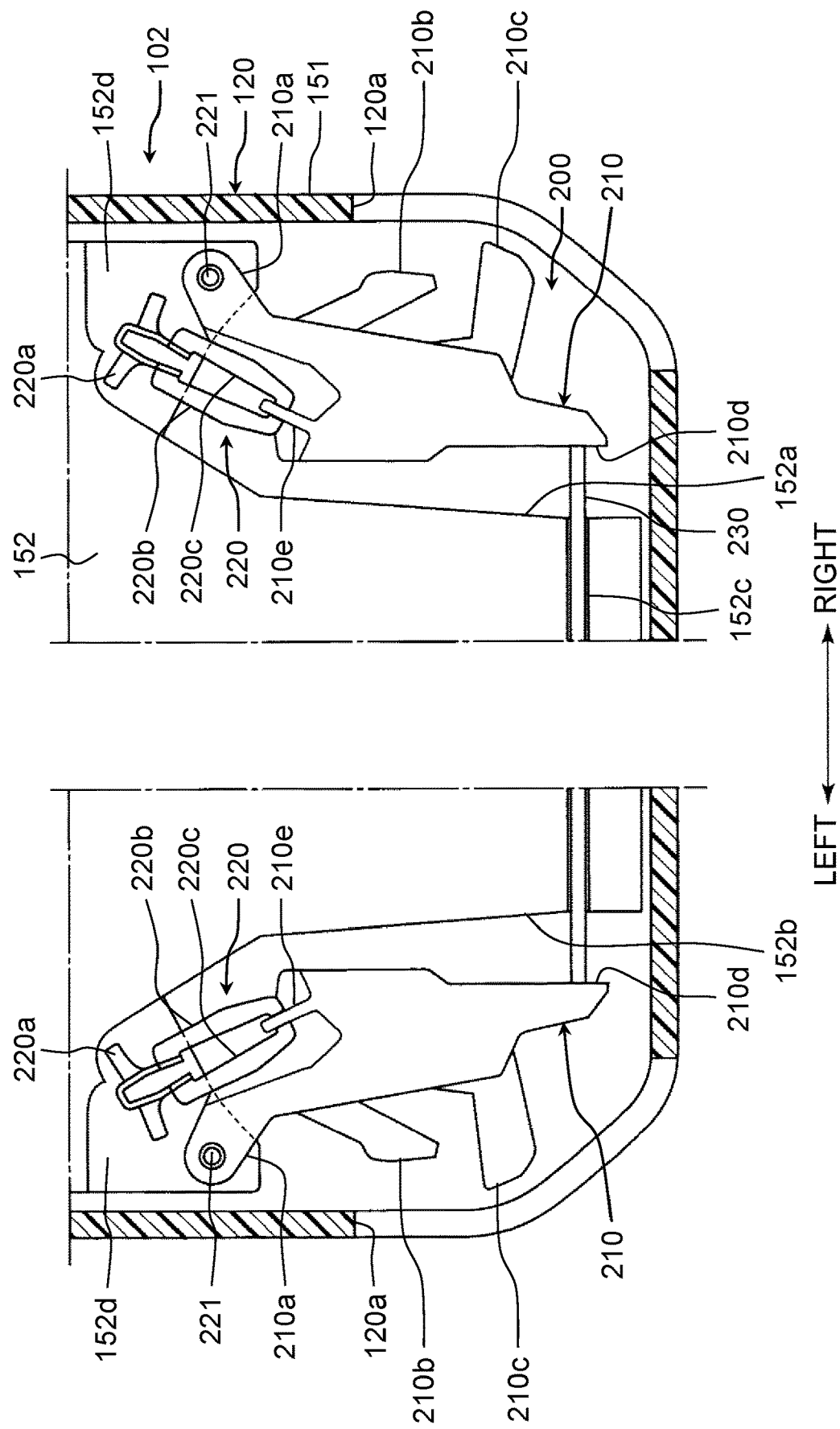
FIG. 8 is a sectional view of the second unit taken along line 7-7 in FIG. 1A.
Figure 9:
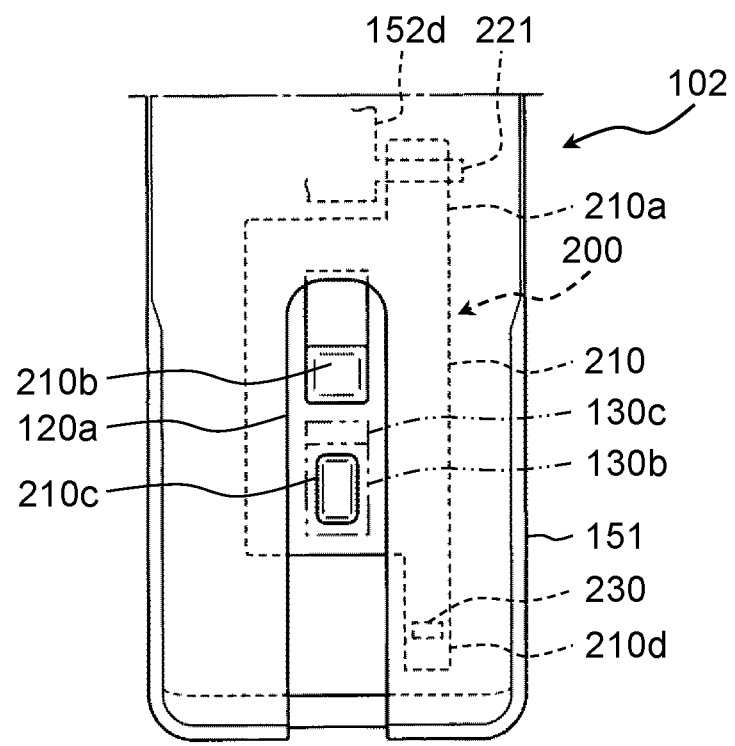
FIG. 9 is a side view of a portion shown by arrow D in FIG. 1C.

FIG. 8 is a view showing a configuration of the interlocking lock mechanism of second unit 102 in the electronic device according to the first exemplary embodiment of the present disclosure. FIG. 8 is a sectional view of the second unit taken along line 7-7 in FIG. 1A.

Second casing 120 of second unit 102 has outside casing 151 and casing body 152. Outside casing 151 covers a side of casing body 152. Outside casing 151 is, for example, formed of resin. Second casing 120 is, for example, formed of magnesium alloy.

Second unit 102 has locked holes 120a on a lower side of each of right and left sides. Locked holes 120a is formed in outside casing 151 that configures second casing 120.

Further, recesses 152a, 152b are formed by respectively cutting away the lower sides of the right and left sides of casing body 152 that configures second casing 120. Oscillation member 210 and spring 220 are disposed in each of recesses 152a, 152b.

Further, casing body 152 is formed with groove 152c that extends in the right and left direction. Bar-shaped member 230 is disposed in groove 152c so as to be movable in the right and left direction.

Here, socket 130 of the electronic device of the present exemplary embodiment is capable of housing second unit 102 even in a state in which any principal surface of second unit 102 faces the front. Accordingly, right and left oscillation members 210 and springs 220 have a bilaterally symmetrical structure. Therefore, oscillation members 210 and springs 220 on one of right and left sides are mainly described, and description of oscillation members 210 and springs 220 on the other side is appropriately omitted. Oscillation member 210 and spring 220 on the left side are described herein.

Oscillation member 210 has base end 210a, abutting part 210b, lock pawl 210c, tip 210d, and spring lock projection 210e.

Supporting shaft 221 formed in supporting base 152d of casing body 152 is inserted in base end 210a. With this configuration, oscillation member 210 is supported by supporting shaft 221 so as to be swingable around supporting shaft 221. FIG. 8 shows a state in which oscillation member 210 is located at a reference position by biasing force of spring 220.

Abutting part 210b extends from a vicinity of base end 210a to locked hole 120a side. When oscillation member 210 is located at the reference position, abutting part 210b is located near locked hole 120a on a device inner side with respect to locked hole 120a.

Lock pawl 210c extends to locked hole 120a side below abutting part 210b. When oscillation member 210 is located at the reference position, lock pawl 210c is located near locked hole 120a on the device inner side with respect to locked hole 120a.

Tip 210d of left oscillation member 210 abuts on a left end of bar-shaped member 230, and tip 210d of right oscillation member 210 abuts on a right end of bar-shaped member 230.

Spring 220 has base end 220a, first spring 220b, and second spring 220c. Spring 220 is fixed to supporting base 152d at base end 220a. First spring 220b and second spring 220c are respectively pressed to spring lock projection 210e of oscillation member 210 from right and left, thereby sandwiching spring lock projection 210e of oscillation member 210 from right and left. Spring 220 biases oscillation member 210 so as to press tip 210d of oscillation member 210 against bar-shaped member 230. It should be noted that the biasing forces of right and left springs 220 are identical or substantially identical. With this configuration, right and left oscillation members 210 are kept at the reference positions shown in FIG. 8 in a state in which bar-shaped member 230 is sandwiched from right and left.

Figure 10:
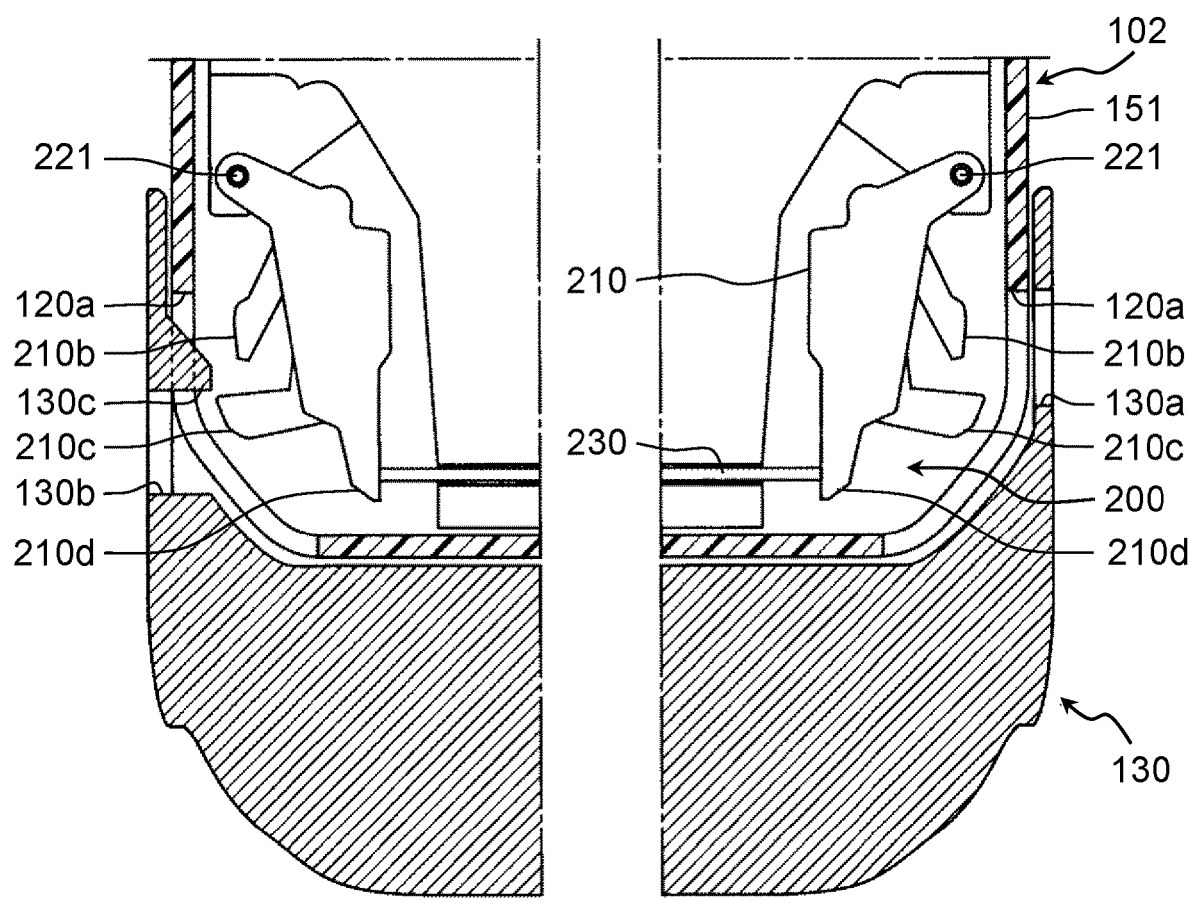
FIG. 10 is a sectional view taken along line 7-7 in FIG. 1A (when a lock projection does not enter the locked holes)

FIG. 10 is a sectional view taken along line 7-7 in FIG. 1A. FIG. 10 shows a state in which lock projection 23b of lock member 23 has not been inserted into locked hole 120a while second unit 102 is attached to socket 130.

While second unit 102 is attached to socket 130, a positional relation and the like between these locked holes 130a, 120a are set so that right locked hole 130a of socket 130 and right locked hole 120a of second unit 102 are adjacent to each other. Further, a positional relation between locked projection 130c and locked hole 120a and shapes of locked projection 130c and locked hole 120a are set such that locked projection 130c on the left side surface of socket 130 enters left locked hole 120a of second unit 102 and that a tip of locked projection 130c is located on a device outer side than the tip of lock pawl 210c of left oscillation member 210. The positional relation and the shapes are set for preventing locked projection 130c and lock pawl 210c of oscillation member 210 from abutting on each other when second unit 102 is attached to socket 130. Also, lock pawl 210c of oscillation member 210 is prevented from being locked to locked projection 130c only by attached to socket 130.

Figure 11:
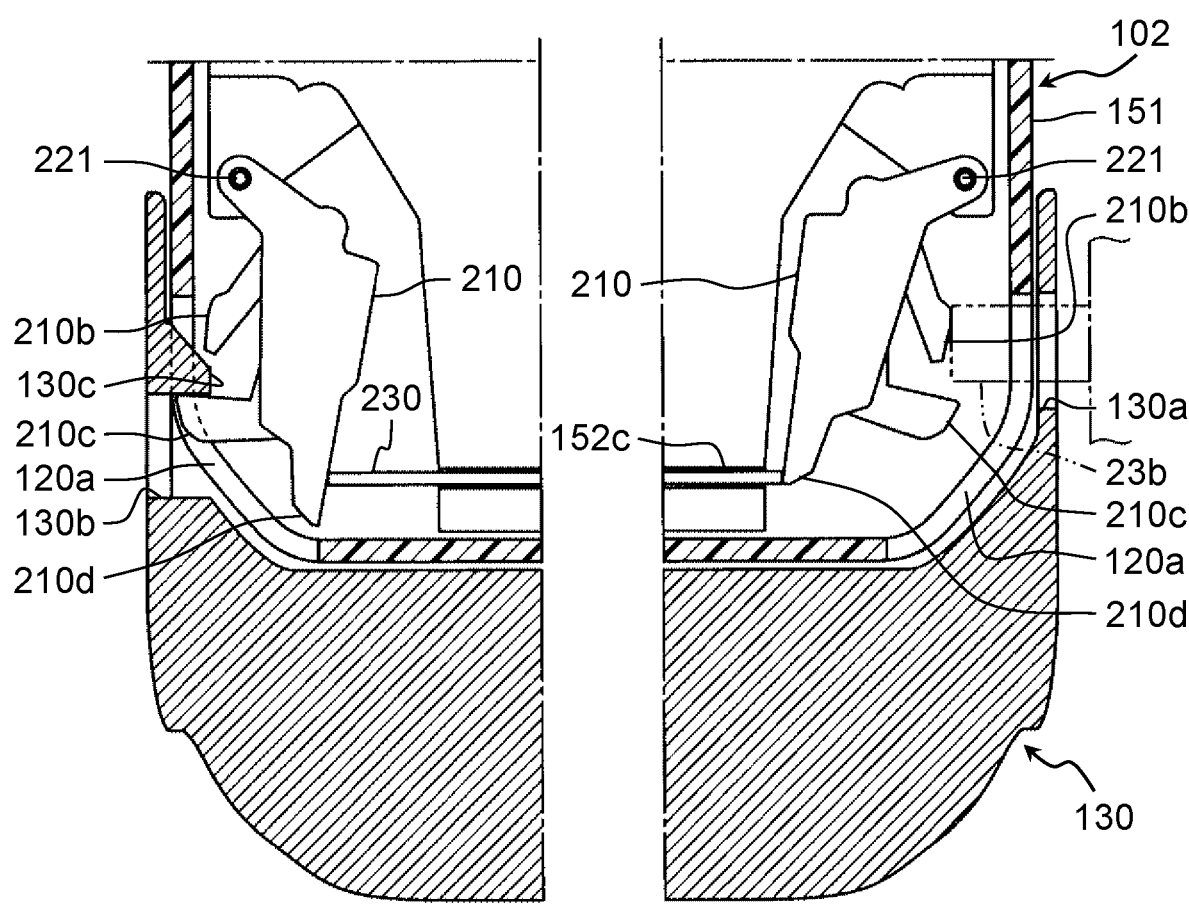
FIG. 11 is a sectional view taken along line 7-7 in FIG. 1A (when the lock projection enters the locked holes).

FIG. 11 is a sectional view taken along line 7-7 in FIG. 1A. FIG. 11 shows a state in which lock projection 23b of lock member 23 has been inserted into locked holes 130a, 120a while second unit 102 is attached to socket 130.

While second unit 102 is attached to socket 130, when lock projection 23b of lock member 23 of mounting device 1 is inserted through locked hole 120a, a position of abutting part 210b of oscillation member 210 is set such that lock projection 23b abuts on abutting part 210b of oscillation member 210. Further, in a state in which lock projection 23b of lock member 23 has been inserted into locked holes 130a, 120a by a predetermined amount, a positional relation between locked projection 130c and locked hole 120a is set such that locked projection 130c on the left side surface of socket 130 is inserted into left locked hole 120a of second unit 102, and lock pawl 210c of left oscillation member 210 is locked to locked projection 130c.

[1-4. Action]

According to the present exemplary embodiment, in the state in which electronic device 100 is mounted on mounting device 1, first casing 110 of electronic device 100 is intermittently surrounded by the plurality of projections 12 disposed around mounting part 11. As a result, movement of first casing 110 in the right and left direction and the front and rear direction is regulated in the mounted state.

Further, in the state in which electronic device 100 is mounted on mounting device 1, when lock member 23 is locked to second casing 120, movement of second casing 120 in the front and rear direction and the up and down direction is regulated by lock member 23. Moreover, in second casing 120, lower side 120S is fitted to socket 130, and front and rear sides and right and left sides of lower side 120S are covered with socket 130. Accordingly, movement of second casing 120 in the right and left direction is also regulated.

Therefore, in the state in which electronic device 100 is mounted on mounting device 1, when lock member 23 is locked to second casing 120, both first casing 110 and second casing 120, that is, entire electronic device 100, cannot be moved from mounting device 1.

Moreover, in the present exemplary embodiment, when lock member 23 is locked to second casing 120, movement of lock member 23 in the device width direction is locked by operating cylinder lock 24 described below with the key. Therefore, lock member 23 cannot be manually unlocked. Hence, a third person other than the user cannot detach and take away the electronic device from mounting device 1, thereby improving security against theft.

Particularly, in the present exemplary embodiment, since interlocking lock mechanism 200 is provided in electronic device 100, the following action can be obtained. The action will be described with reference to FIG. 11. In other words, in the state in which second unit 102 is attached to socket 130, when lock projection 23b of lock member 23 of mounting device 1 is inserted through right locked hole 130a of socket 130 and right locked hole 120a of second unit 102, lock projection 23b abuts on abutting part 210b of right oscillation member 210. When lock projection 23b further enters the device inner side (the left side), abutting part 210b of right oscillation member 210 is pressed to the device inner side of second unit 102 by lock projection 23b. With this configuration, right oscillation member 210 oscillates counterclockwise. As a result, bar-shaped member 230 moves to the left, and further, left oscillation member 210 oscillates counterclockwise. At this time, lock pawl 210c of left oscillation member 210 moves below locked projection 130c on the left side surface of socket 130. With this configuration, second unit 102 is locked to socket 130 such that the left side cannot be lifted upward.

In this way, according to electronic device 100 of the present exemplary embodiment, second unit 102 is locked to lock projection 23b of lock member 23 along with socket 130 on the right side. Accordingly, the right side of second unit 102 cannot be lifted upward with respect to lock member 23 (mounting device 1) and socket 130 (first unit 101). Further, second unit 102 is locked to socket 130 on the left side. Accordingly, the left side cannot be lifted upward with respect to socket 130 (first unit 101). In other words, both the right and left sides of second unit 102 cannot be lifted upward with respect to socket 130. Accordingly, security against theft further improves.

Further, in electronic device 100 of the present disclosure, when electronic device 100 is locked to mounting device 1, it is no longer necessary for the user to perform lock operation on each of first unit 101 and second unit 102. Therefore, convenience of the user improves.

Further, since the right and left sides are locked, strength of the locking can be improved. Unlike the present exemplary embodiment, in a configuration in which only one side is locked, when another side is strongly lifted, lock projection 23b of lock member 23 can be broken. In this case, second unit 102 can be detached. However, such breakage does not occur in electronic device 100 of the present exemplary embodiment.

[2. Effects Etc.]

Electronic device 100 of the present exemplary embodiment includes first unit 101 having the input part and second unit 102 having the display, and first unit 101 and second unit 102 are detachably coupled. First unit 101 includes socket 130 capable of housing a predetermined side of second unit 102. Locked holes 130a, 120a (insertion holes), into which lock projection 23b (a security member) of lock member 23 can be inserted, are provided on one of the right and left sides of socket 130 and second unit 102.

Interlocking lock mechanism 200 is provided on another of the right and left sides of socket 130 and second unit 102. Interlocking lock mechanism 200 locks second unit 102 to socket 130 when lock projection 23b (the security member) of lock member 23 is inserted into locked holes 130a, 120a (the insertion holes).

With this configuration, in electronic device 100 of the present exemplary embodiment, when lock projection 23b (the security member) of lock member 23 is inserted into locked holes 130a, 120a (the insertion holes) provided on the one side of socket 130 and second unit 102, second unit 102 can be locked to socket 130 on these two right and left sides. Therefore, strength of locking can be improved more than a case where second unit 102 is locked to socket 130 on one side. Further, security against theft can be improved in the electronic device in which first unit 101 and second unit 102 are separable.

Further, in electronic device 100 of the present disclosure, when electronic device 100 is locked to mounting device 1, it is no longer necessary for the user to perform lock operation on each of first unit 101 and second unit 102. Therefore, convenience of the user improves.

In the present exemplary embodiment, interlocking lock mechanism 200 has locked projection 130c (a lock part), a bar-shaped member 230, and lock pawl 210c (a lock member). Locked projection 130c is provided on the other of the right and left sides of socket 130. Bar-shaped member 230 is provided in second unit 102, and is displaced when lock projection 23b (the security member) of lock member 23 is inserted into locked holes 130a, 120a (the insertion holes). Lock pawl 210c (the lock member) is locked to locked projection 130c (the lock part) of socket 130 when bar-shaped member 210 is displaced.

With this configuration, interlocking lock mechanism 200 can be realized with a simple configuration by bar-shaped member 230 and lock pawl 210c (the lock member).

Other Exemplary Embodiments

As above, the first exemplary embodiment is described as an illustration of a technique disclosed in the present application. However, the technique in the present disclosure is not limited to this first exemplary embodiment, and is also applicable to exemplary embodiments that are appropriately changed, replaced, added, omitted, or the like. Further, a new exemplary embodiment can be implemented by combining the respective components explained in the above-described first exemplary embodiment.

In the above-described exemplary embodiment, abutting part 210b and lock pawl 210c of oscillation member 210 are integrally formed in oscillation member 210. However, a portion of abutting part 210b and lock pawl 210c of oscillation member 210 may be separated from the other portion of oscillation member 210. In this case, for example, a spring that can be biased in the device width direction may be provided between an oscillation member and a member that configures an abutting part and a lock pawl. A positional relation in the device width direction between the oscillation member and the member that configures the abutting part and the lock pawl can be changed. With this configuration, for example, even in a case where a type of mounting device is changed, and an insertion amount of a lock projection of a lock member into the locked holes of the second unit is increased, when the lock pawl on the other side abuts against an inner surface of the casing, the lock pawl on the other side is not strongly pressed against the inner surface of the casing while the oscillation member oscillates. Hence, for example, even in the case where the type of mounting device is changed, breakage of the lock pawl or interlocking lock mechanism 200 is prevented.

In the above-described exemplary embodiment, lock projection 23b included in mounting device 1 is described as an example of the security member. However, the technique in the present disclosure is not limited to this lock projection. A lock projection included in a member, called Kensington lock or security wire lock, can be utilized as the security member.

As above, the exemplary embodiments are described as the illustration of the technique in the present disclosure. For that purpose, the attached drawings and the detailed description are provided.

Therefore, the components mentioned in the attached drawings and the detailed description may include not only components that are essential for solving the problems, but also components that are not essential for solving the problems to illustrate the technique. Accordingly, those nonessential components should not be immediately recognized as essential just because those nonessential components are mentioned in the attached drawings or the detailed description.

Further, since the aforementioned exemplary embodiments illustrate the technique in the present disclosure, various changes, replacements, additions, omissions, or the like can be made in the claims and their equivalents.

The present disclosure is widely applicable to an electronic device including a first unit having an input part and a second unit having a display. The first unit and the second unit are detachably coupled.

What is claimed is:
1. An electronic device comprising:
a first unit having an input part; and
a second unit having a display, the first unit and the second unit being detachably coupled,
wherein the first unit includes a socket capable of housing a predetermined side of the second unit,
an insertion hole is provided on an upper part of the socket at a side of the socket, into which a security member can be inserted from an exterior of the socket while the predetermined side of the second unit is housed in the socket, and
an interlocking lock mechanism is provided on a side of the second unit, and as a result of the security member being inserted into the insertion hole from the exterior of the socket, the interlocking lock mechanism is engaged and repositioned by the security member to cause the interlocking lock mechanism to lock the second unit to the socket; and
a lock part provided on the socket,
wherein, the interlocking lock mechanism has
a bar-shaped member provided in the second unit and displaced by the security member when the security member is inserted into the insertion hole, and
a lock member locked to the lock part of the socket when the bar-shaped member is displaced.

* * * * *